United States Patent [19]

Paullus et al.

[11] Patent Number: 4,974,625

[45] Date of Patent: Dec. 4, 1990

[54] FOUR MODE PNEUMATIC RELAY

[75] Inventors: Steve B. Paullus; Richard J. Winkler, both of Marshalltown, Iowa

[73] Assignee: Fisher Controls International, Inc., Clayton, Mo.

[21] Appl. No.: 384,547

[22] Filed: Jul. 24, 1989

[51] Int. Cl.⁵ .............................................. G05D 16/06

[52] U.S. Cl. ..................................... 137/85; 137/270.5

[58] Field of Search .................... 137/85, 86, 269, 270, 137/270.5

[56] References Cited

U.S. PATENT DOCUMENTS

| | | | |
|---|---|---|---|
| 2,940,798 | 6/1960 | Weber | 137/270 X |
| 2,966,168 | 12/1960 | Hunt | 137/270 |
| 3,413,997 | 12/1968 | Taylor | 137/270 |
| 3,602,246 | 8/1971 | Hettinger | 137/270 |
| 3,901,267 | 8/1975 | Moon | 137/270 |
| 4,105,047 | 8/1978 | Smallwood | 137/625.6 |
| 4,285,357 | 8/1981 | Jones | 137/85 |
| 4,290,441 | 9/1981 | Scott et al. | 137/84 |
| 4,327,762 | 5/1982 | Scott et al. | 137/85 |
| 4,518,004 | 5/1985 | Hsu et al. | 137/116 |
| 4,627,569 | 12/1986 | Morris | 236/49 |
| 4,653,523 | 3/1987 | Brown | 137/85 |

*Primary Examiner*—Alan Cohan

*Attorney, Agent, or Firm*—Nicholas A. Camasto; Dale A. Kubly; Arnold H. Cole

[57] ABSTRACT

A four-mode pneumatic relay includes a relay body defining four chambers, each coupled to a port. Two of the chambers are formed by a diaphragm assembly consisting of a rolling diaphragm coupled to an input post that drives a movable orifice shaft and a pair of diaphragms of different effective areas coupled to said movable orifice shaft. A movable plug assembly includes valve plugs for interconnecting the first chamber with the second chamber and the second chamber with the third chamber via a valve seat and an orifice and recess in the movable orifice shaft. A pair of mechanical switches couple different ones of said ports for providing multi-mode operation. One switch supplies input pressure to either the first port or the third port and another switch couples the second and fourth ports together to vents the fourth port.

6 Claims, 2 Drawing Sheets

FOUR MODE PNEUMATIC RELAY

BACKGROUND OF THE INVENTION AND PRIOR ART

This invention relates generally to pneumatic relays and specifically to a pneumatic relay that is capable of being reconfigured for multi-functional operation in a rapid, cost effective manner.

Pneumatic relays are in widespread use for controlling valves, actuators and the like. Basically, a pneumatic relay is a device that supplies a controlled output pressure to a load or utilization device, such as an actuator or a piston, in response to an input signal, a pressure or a force. Pneumatic relays are required to function in either a proportional or an on/off mode. In the proportional mode, a pressure output that is proportional to a pressure or force input is developed. In the on/off mode a constant pressure output, usually equal to the supply pressure, is provided for a given range of pressure or force inputs. The on/off mode of operation is often referred to as "snap action". In either of these two modes, the relay may operate in a direct or a reverse manner. Direct operation is where the output of the relay increases with increasing input, whereas in reverse operation the relay output decreases with an increasing input.

All the above functions are performed by various relays in the prior art. The distinction is, that in the present invention, a novel pneumatic relay design is disclosed in which the simple operation of a pair of mechanical port switches reconfigures the relay for proportional or snap action in either a direct or a reverse mode. The two simple position type switches are located on the relay body and may be operated manually.

OBJECTS OF THE INVENTION

A principal object of the invention is to provide a novel multi-function pneumatic relay.

Another object of the invention is to provide a relay that is capable of operational mode changes without hardware changes.

A further object of the invention is to provide a novel four mode pneumatic relay that may be configured for any combination of direct/snap, direct/proportional, reverse/snap or reverse/proportional operation.

BRIEF DESCRIPTION OF THE DRAWINGS

These and other objects and advantages of the invention will be apparent upon reading the following description in conjunction with the drawings, in which.

DESCRIPTION OF THE PREFERRED EMBODIMENT

Figure 1:
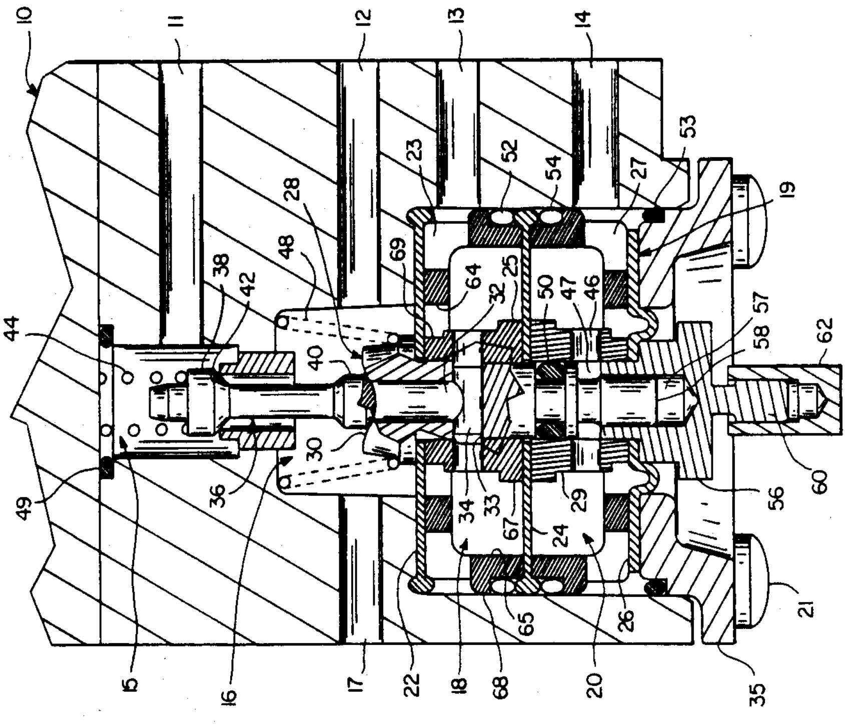
FIG. 1 is a sectional view through a relay body showing the elements of the invention.

Referring to FIG. 1, a relay body 10 is shown in cross section and includes a series of input and output ports that communicate with respective chambers formed within a relay body 10. An input port 11 communicates with a chamber 15, an output port 12 and a pressure outlet port 17 communicate with a chamber 16, an input port 13 communicates with a chamber 18 and an output port 14 communicates with chamber 20. Pressure outlet port 17 is connected to the load or utilization device (not shown). A diaphragm cage assembly 19 includes first and second annular diaphragms 22 and 24 and a rolling annular diaphragm 26 that are supported by a pair of outer spacers 23 and 27, and a pair of inner spacers 25 and 29. It should be noted that, while the diaphragms are shown as generally being flat, dished diaphragms may be used also. An orifice shaft 28 is positioned in the circular openings 47 (see FIG. 6) of the inner spacers 25 and 29 and includes a valve seat 30 at one end and an extension 58 at the other end. Extension 58 is fitted in a hole 57 in a round bodied input post 56 that has a stepped portion that engages a circular opening in rolling diaphragm 26. The input post terminates in an end post 60 to which is affixed an adjustment cap 62. Diaphragm cage assembly 19 is sandwiched in relay body 10 by means of an end cover 35 and screws 21.

A plug assembly 36 has a valve plug 38 at one end and a valve plug 40 at the other end. Valve plug 38 cooperates with a valve seat 42 that is supported in relay body 10 and a valve plug 40 cooperates with valve seat 30 on orifice shaft 28. A compression spring 44, located in chamber 15, urges valve plug 38 into engagement with valve seat 42. Similarly, a compression spring 48, located in chamber 16, acts between relay body 10 and a shoulder on orifice shaft 28 to urge valve seat 30 of orifice shaft 28 out of engagement with valve plug 40 on plug assembly 36. A T-shaped opening is formed in a portion of orifice shaft 28 by virtue of an intersecting axial hole 32 and a transverse hole 34. Transverse hole 34 is formed in a recess 33 in orifice shaft 28. As will be seen, the holes and the recess permit communication between chamber 16 and chamber 18 when valve plug 30 is displaced from valve seat 40. Chamber 18 is partially defined in relay body 10 by diaphragm 22 and diaphragm 24, which are maintained in spaced apart relationship by outer spacer 23 and inner spacer 25. Similarly, chamber 20 is partially defined in body 10 by diaphragm 24 and rolling diaphragm 26, which are spaced apart by the cooperative action of outer spacer 27 and inner spacer 29.

Orifice shaft 28 includes a reduced diameter section in which an O-ring 50 is positioned for maintaining a pressure seal with inner spacer 29. Outer spacers 23 and 27 include peripheral ridges or lips 68 that cooperate with O-rings 52 and 54 and the peripheral portion of diaphragm 24 to isolate chambers 18 and 20.

Figure 2:
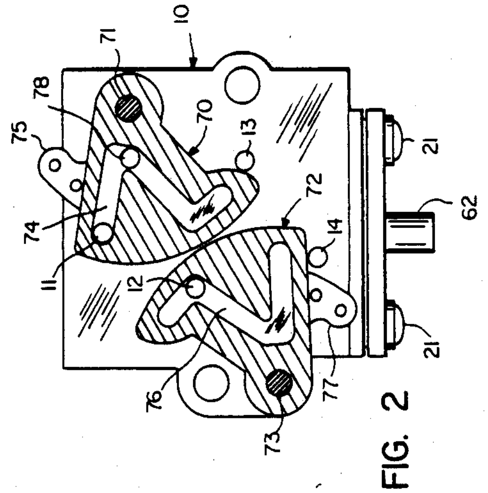
FIG. 2 is a reduced side view of a relay body showing the port switches in cross section.

In FIG. 2, a pair of generally triangular shaped port switches 70 and 71 are mounted for pivotal movement on relay body 10, by means of respective pins 71 and 73. The port switches are sectioned to reveal serpentine channels 74 and 76 which serve to pneumatically couple various ones of the input and output ports to sources of input and output pressure (not shown). For example, a pressure inlet port 78 is shown in communication with channel 74. In the position illustrated for switch 70, input port 11 is in communication with pressure inlet port 78, whereas input port 13 is vented to the atmosphere. As should be apparent, a small angular counterclockwise rotation of switch 70 will couple input port 13 to pressure inlet port 78 and vent input port 11. Switch 70 has detent arrangements (not illustrated) and is movable by manipulation of a handle 75 affixed thereto. Similarly, switch 72 is provided for coupling output port 14 via channel 76 to output port 12. In the illustrated position of switch 72, output port 14 is vented to atmosphere. By a small angular clockwise movement of switch 72, both output port 12 and output port 14 will be placed in communication. Switch 72 is similarly detented on relay body 10 by means (not shown) and includes a handle 77 for actuation thereof. As will be apparent, port switch 70 serves to change the relay from direct to reverse operation and port switch 72 serves to alter the relay from proportional to snap action mode.

Figure 3:
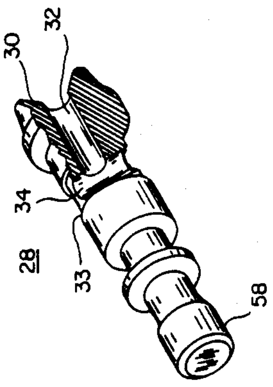
FIG. 3 is a partial perspective cutaway view of the orifice shaft of the invention.

In FIG. 3, the partially broken away perspective of orifice shaft 28 illustrates the arrangement of internal orifices or holes 32 and 34 and recess 33.

Figure 5:
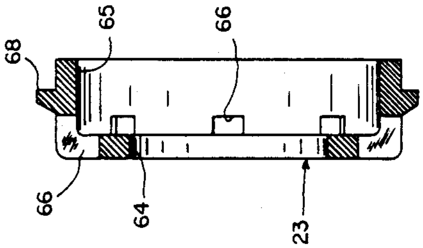
FIG. 5 is a sectional view of FIG. 4 taken along the line 5—5.
Figure 4:
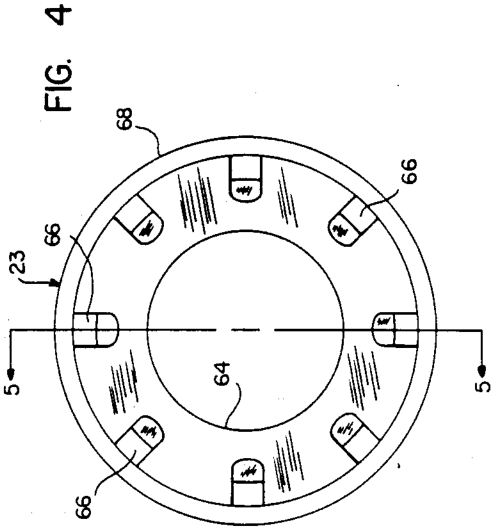
FIG. 4 is a plan view of an outer spacer of the diaphragm cage of the invention.

FIG. 4 and FIG. 5 show the general construction of outer spacer 23. It will be appreciated that outer spacer 27 is of similar construction. Outer spacer 23 is generally cup shaped and has eight cutout portions 66 equally spaced thereabout. Lip 68 defines the outer circumference of spacer 23. Inner hole 64 defines the effective working area of diaphragm 22 in conjunction with a circumference 69 on inner spacer 25, as will be described.

Figure 7:
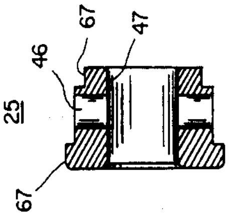
FIG. 7 is a sectional view of FIG. 6 taken along the line 7—7.
Figure 6:
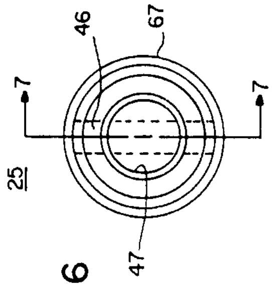
FIG. 6 is a plan view of an inner spacer of the diaphragm cage of the invention.

FIGS. 6 and 7 show plan and sectional views of inner spacer 25, it being understood that inner spacer 29 is similarly configured. The two circumferences 67 and 69 of spacer 23, in conjunction with outer spacer 23, determine the effective areas of the diaphragms. Spacer 25 is generally cylindrical with an axial orifice 47 therethrough for passage of orifice shaft 28 and a transverse hole 46 that aligns with transverse hole 34 in orifice shaft 28.

In operation, the port switches 70 and 72 are positioned to effect the particular mode and type of operation desired. The first operation described will be proportional/direct. This operation corresponds to the port switches being in the positions illustrated in FIG. 2, namely with supply pressure from pressure inlet port 78 being applied to input port 11 and with output port 12 being coupled to the load device (not shown) via chamber 16 and pressure outlet port 17 (see FIG. 1). The supply pressure is contained within chamber 15 as valve seat 42 is tightly shut off by valve plug 38 on plug assembly 36, assuming that no force is applied to adjustment nut 62. Because of the tight shutoff, there is no output pressure in chamber 16 and no output to output port 12. As force is applied to the input post 56 via adjustment nut 62, the valve plug 38 remains in contact with valve seat 42 until the force is sufficient to overcome the pressure unbalance between the supply pressure and the output pressure and the force applied by springs 44 and 48. This is because the orifice shaft 28 is moved (upwardly in the drawing) by the force applied to input post 56 (through adjustment nut 62). The output pressure in output port 12 is converted to a force by diaphragm 22, which operates as a feedback diaphragm, and tends to offset the applied input force. Output pressure is developed by virtue of the input force overcoming the above-mentioned spring forces and pressure unbalance and enabling some of the input pressure to pass to chamber 16 from chamber 15 when valve plug 38 is displaced from valve seat 42. At equilibrium all valve plugs are closed against their respective valve seats and an output pressure that is proportional to the input force is trapped in chamber 16 and passed to the controlled device (not shown) via pressure outlet port 17. Should the input force decrease such that the force generated by the output pressure on diaphragm 22 is greater, the valve seat 30 and valve plug 40 will separate to vent the chamber 16, through orifices 32 and 34 in orifice shaft 28, to input port 13 which, it will be recalled, is exposed to atmosphere. Changes in input force result in a new equilibrium state for the relay with the output pressure being directly proportional to the input force. It will be appreciated by those skilled in the art that input force on adjustment nut 62 may be derived from any number of well known means including pressure signals and direct mechanical forces.

In snap action/direct operation, port switch remains in the position just described but port switch 72 is rotated in a clockwise direction such that output ports 12 and 14 are in communication with each other via channel 76 and in communication with pressure outlet port 17 via chamber 16. Again, assuming no force is applied to input post 56, supply pressure is contained within chamber 15 and there is a tight shutoff between valve plug 38 and valve seat 42. Valve plug 38 remains closed against valve seat 42 until a sufficient force is applied to the input post 56 to overcome the pressure unbalance on the valve plug 38 and the spring force of springs 44 and 48. When the input force is great enough to displace valve plug 38 from valve seat 42, output pressure increases in both chambers 16 and 20 because output ports 12 and 14 are coupled together. The effective area of diaphragm 24 is larger than the effective area of diaphragm 22 so that a net positive feedback force is generated to rapidly drive plug 38 away from valve seat 42 and fully open the passageway between chambers 15 and 16. The effective area of diaphragm 24 is defined by the outer circumference 67 of inner spacer 25 and inner diameter 65 of outer spacer 23. The effective diameter of diaphragm 22 is defined by the circumference 69 of inner spacer 25 and the diameter of hole 64 in outer spacer 23. The difference in effective diameters is readily apparent with the effective diameter of diaphragm 24 being much larger than that of diaphragm 22. As the input force decreases on input post 56, the forces generated by springs 44 and 48 allow closure of valve plug 38 and valve seat 42. As the input force decreases further, the force generated by spring 48 allows valve seat 30 in orifice shaft 28 to move away from valve plug 40 on plug assembly 36 and vent the output pressure. This occurs through holes 32 and 34 and recess 33 of orifice shaft 28 and input port 13 which is exposed to atmosphere. The differential in the areas of diaphragms 22 and 24 now provide positive feedback in the other direction to permit rapid venting of the output pressure. It is apparent that there is a range of input forces that allows the relay to provide full supply pressure to the output.

For proportional/reverse operation, port switch 70 is positioned to supply input pressure to input port 13 and to vent input port 11. The port switch 72 is positioned as illustrated for the snap action/direct operation with output ports 12 and 14 being in communication. The applied pressure is contained in chamber 18 which communicates with the input port 13. With no force on input post 56, valve plug 40 is fully off of valve seat 30 and valve plug 38 is fully seated on valve seat 42. Full supply pressure is thus available in chamber 16, and via interconnected output ports 12 and 14, in chamber 20. To bring the output to zero, an input force is required at input post 56 to overcome the force due to the applied pressure in chamber 18 as multiplied by the differential areas of diaphragms 22 and 24 and the force of springs 44 and 48. The output pressure in chambers 16 and 20 decreases with increasing force on input post 56. With a decrease in input force, the force unbalance created by the difference in areas of diaphragms 22 and 24 causes the seat 30 on orifice shaft 28 to move away from valve plug 40 and provide an output pressure that is coupled back to chamber 20 via the interconnected output ports 12 and 14. The output pressure in chamber 20 and diaphragm 24 develops a force that causes the valve seat 30 to move back into engagement with valve plug 40. Therefore a decreasing force input creates a proportional increase in pressure output.

For snap action/reverse operation, the port switch 70 remains in the position illustrated for proportional/reverse operation but port switch 72 is positioned such that input port 12 is no longer in communication with output port 14 which is vented. With no force on input plug 56, valve plug 40 and valve seat 30 are fully open and valve plug 38 and valve seat 42 are fully closed. To bring the pressure output to zero, an input force is required to overcome the force due to the supply pressure as multiplied by the area of diaphragm 24 and force of springs 44 and 48. When the required input force is attained, the valve plug 40 reseats on valve seat 30 and output pressure is vented through input port 11 via chamber 15 because plug assembly 36 moves valve plug 38 away from valve seat 42. The decrease in pressure in chamber 16 has the effect of providing positive feedback and drives valve plug 38 wide open allowing the output pressure to go to zero via chamber 15 in input port 11. The corresponding decrease in input force allows valve plug 38 to reseat and valve plug 40 to open as valve seat 30 in orifice shaft 28 is moved away from it. This decreasing input force causes an increase in the output pressure in chamber 16 which drives valve seat 30 fully open, allowing the output pressure to equalize with the supply pressure. Thus, there is an input force that when exceeded causes the output to be at atmospheric pressure. For smaller input forces the output is at supply pressure. Consequently, reverse/snap action is provided.

It will be appreciated that the arrangement of the diaphragm areas is a function of the operating environment and that different sizes of pneumatic relays may be utilized to meet different operational conditions. The principles of the invention, however, remain the same with a pneumatic relay that is readily changeable for four types or modes of operation based upon the simple movement of a pair of port switches.

It is recognized that numerous changes in the described embodiment of the invention will be apparent to those skilled in the art without departing from its true spirit and scope. The invention is to be limited only as defined in the claims.

What is claimed is:

1. A force balanced multi-mode pneumatic relay comprising:

a relay body including first and second input ports and first and second output ports;

an orifice shaft movable in response to an input force;

diaphragm means coupled to said orifice shaft and in communication with said second input port and said first and second output ports;

valve plug means engageable with said orifice shaft for opening and closing a first valve seat, situated between said first input ports and said first output port, and a second valve seat in said orifice shaft, said orifice shaft including means communicating between said first output port and said second input port;

spring means for applying forces to said orifice shaft and to said valve plug means; and mechanical switch means for selectively enabling supply and output pressures to be coupled to different ones of said ports for selectively changing the operating mode of said relay among direct/snap, direct/proportional, reverse/snap and reverse/proportional modes.

2. A four-mode pneumatic relay comprising:

a relay body including two input and two output ports communicating with corresponding first and third and second and fourth chambers respectively in said relay body;

diaphragm means in said relay body communicating with said second, third and fourth chambers;

a movable orifice shaft means coupled to said diaphragm means and including a valve seat for coupling said second chamber to said third chamber;

a movable valve plug assembly for pneumatically coupling said first and said second chambers, and for pneumatically coupling said second and said third chambers via said orifice shaft means; and a pair of mechanical switches for selectively pneumatically coupling said second and said fourth chambers and venting said fourth chamber and for selectively applying input pressure to said first and said third chambers.

3. The relay of claim 2 wherein said diaphragm means includes diaphragms of different effective areas.

4. The relay of claim 3 wherein said movable orifice shaft means includes a passageway communicating between said second and said third chambers.

5. The relay of claim 4 wherein said movable orifice shaft means includes an input post coupled to said diaphragm means, and further including an adjustable cap on said input post for coupling input forces to said movable orifice shaft means.

6. A pneumatic relay selectively operable in direct/snap, direct/proportional, reverse/snap and reverse/proportional modes responsive to operation of first and second mechanical switches comprising:

a relay body;

diaphragm means supported in said relay body;

four chambers formed by said diaphragm means in said relay body;

two inlet ports and two outlet ports communicating with respective ones of said chambers;

orifice shaft means responsive to external forces coupled to said diaphragm means;

valve means cooperating with said orifice shaft means for enabling communication between said two inlet ports and one of said output ports;

said first mechanical switch selectively supplying pressure to one and venting the other of said inlet ports and supplying pressure to the other and venting the one of said inlet ports; and a second mechanical switch selectively venting one of said outlet ports and coupling said outlet ports together.

* * * * *

UNITED STATES PATENT AND TRADEMARK OFFICE

CERTIFICATE OF CORRECTION

PATENT NO. : 4,974,625

DATED : December 4, 1990

INVENTOR(S) : Steve B. Paullus & Richard J. Winkler

It is certified that error appears in the above-identified patent and that said Letters Patent is hereby corrected as shown below:

Title Page, in the Abstract:

line 16 (last line of Abstract), delete "to", insert --or--.

Signed and Sealed this

Fourth Day of June, 1991

Attest:

HARRY F. MANBECK, JR.

*Attesting Officer* *Commissioner of Patents and Trademarks*